(12) United States Patent
Yoshioka et al.

(10) Patent No.: US 10,101,855 B2
(45) Date of Patent: Oct. 16, 2018

(54) OPTICAL WAVEGUIDE AND POSITION SENSOR USING SAME

(71) Applicant: NITTO DENKO CORPORATION, Ibaraki-shi, Osaka (JP)

(72) Inventors: Ryoma Yoshioka, Ibaraki (JP); Yusuke Shimizu, Ibaraki (JP); Naoki Shibata, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/325,479

(22) PCT Filed: Jul. 17, 2015

(86) PCT No.: PCT/JP2015/070473
§ 371 (c)(1),
(2) Date: Jan. 11, 2017

(87) PCT Pub. No.: WO2016/017443
PCT Pub. Date: Feb. 4, 2016

(65) Prior Publication Data
US 2017/0160873 A1   Jun. 8, 2017

(30) Foreign Application Priority Data

Jul. 31, 2014 (JP) .................. 2014-156331

(51) Int. Cl.
*G06F 3/042* (2006.01)
*G01L 1/24* (2006.01)
(Continued)

(52) U.S. Cl.
CPC ............ *G06F 3/0421* (2013.01); *G01B 11/00* (2013.01); *G01L 1/243* (2013.01); *G02B 6/125* (2013.01)

(58) Field of Classification Search
USPC .......................................... 345/175
See application file for complete search history.

(56) References Cited

U.S. PATENT DOCUMENTS 7,221,826 B2   5/2007   Hanashima et al.
9,239,641 B2   1/2016   Shimizu et al.
(Continued)

FOREIGN PATENT DOCUMENTS

JP   3-240006 A   10/1991
JP   3-287206 A   12/1991
(Continued)

OTHER PUBLICATIONS

International Search Report dated Aug. 18, 2015, issued in counterpart application No. PCT/JP2015/070473. (2 pages).
(Continued)

*Primary Examiner* — Srilakshmi K Kumar
*Assistant Examiner* — Chineyere Wills-Burns
(74) *Attorney, Agent, or Firm* — Westerman, Hattori, Daniels & Adrian, LLP (57) ABSTRACT

There are provided an optical waveguide including cores arranged in a lattice form in which intersection loss is further reduced where, at each intersection of the cores including first and second cores extending in two intersecting directions, the first core is separated by the second core and a gap is formed between the second core and each of the end portions of the first core, and a position sensor using the same. The position sensor includes an optical waveguide including cores arranged in a lattice form. At each intersection of the cores including first and second cores extending in two intersecting directions, the first core is separated by the second core, and a gap is formed between the second
(Continued)

core and each of the end portions of the first core. The width of the end portions of the first core is greater than the width of the second core.

3 Claims, 5 Drawing Sheets

(51) Int. Cl.
*G02B 6/125* (2006.01)
*G01B 11/00* (2006.01)

(56) References Cited

U.S. PATENT DOCUMENTS

| | | | |
|---|---|---|---|
| 2004/0067023 A1 | 4/2004 | Hanashima et al. | |
| 2005/0041918 A1* | 2/2005 | Shibata | G02B 6/12007 385/24 |
| 2009/0245723 A1* | 10/2009 | Hashimoto | G02B 6/1228 385/14 |
| 2010/0156848 A1* | 6/2010 | Yatsuda | B29D 11/00663 345/175 |
| 2012/0318074 A1* | 12/2012 | Kyung | G01L 1/243 73/862.624 |
| 2015/0241991 A1 | 8/2015 | Shimizu et al. | |

FOREIGN PATENT DOCUMENTS

| | | |
|---|---|---|
| JP | 2004-258610 A | 9/2004 |
| JP | 2006-251429 A | 9/2006 |
| JP | 2010-156869 A | 7/2010 |
| JP | 5513656 B1 | 6/2014 |

OTHER PUBLICATIONS

Notification of Transmittal of Copes of Translation of the International Preliminary Report on Patentability (Forms PCT/IB/338) issued in counterpart International Application No. PCT/JP20151070473 dated Feb. 9, 2017 with Forms PCT/IB/373 and PCT/ISA/237 (7 pages).

Office Action dated Dec. 5, 2017, issued in counterpart Japanese Application No. 2014-156331, with English translation. (6 pages).

* cited by examiner

RELATED ART

FIG. 8

RELATED ART

OPTICAL WAVEGUIDE AND POSITION SENSOR USING SAME

TECHNICAL FIELD

The present invention relates to an optical waveguide, and a position sensor using the same for optically sensing a pressed position.

BACKGROUND ART

Figure 7:
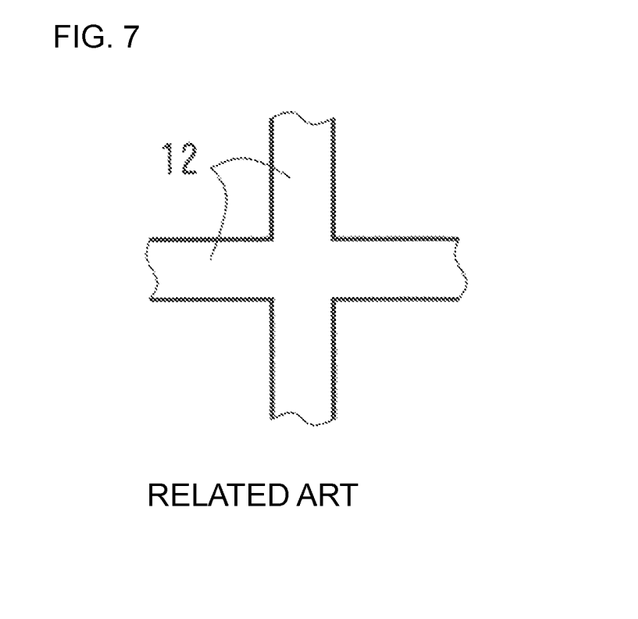
FIG. 7 is a schematic plan view of a continuous intersection of the cores in a conventional optical waveguide.

The present applicant has already proposed a position sensor for optically sensing a pressed position (see PTL 1, for example). This position sensor includes: an optical waveguide in a sheet form including two cladding layers each in a sheet form, and a plurality of linear cores arranged in a lattice form and serving as an optical path, the cores being held between the two cladding layers; a light-emitting element for propagating light through the cores arranged in the lattice form; and a light-receiving element for receiving the propagated light. When part of the surface of the position sensor itself corresponding to the cores arranged in the lattice form is pressed with a pen tip and the like, some of the cores corresponding to the pressed part are deformed. Thus, the level of light coming from the cores corresponding to the pressed part and detected by the light-receiving element is decreased, so that the pressed position is sensed. Each intersection of the cores arranged in the lattice form is a continuous intersection where cores 12 are continuous, as shown in FIG. 7.

Figure 8:
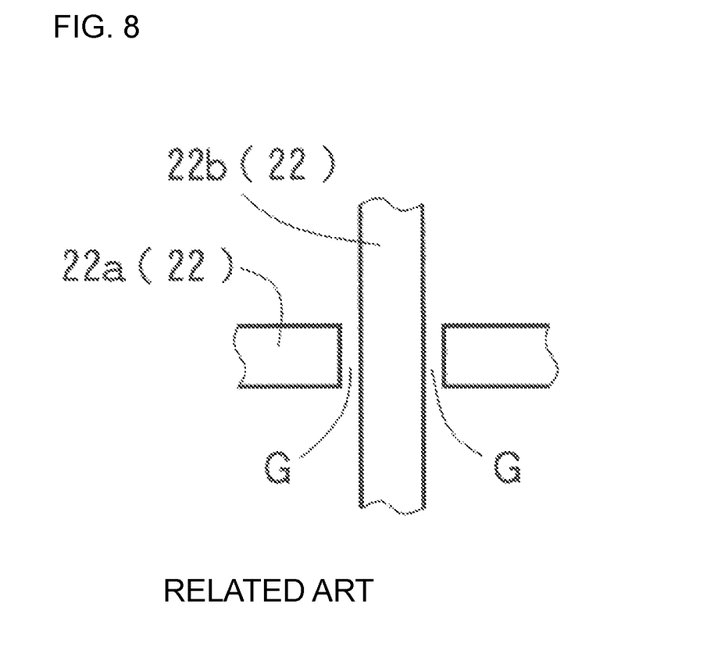
FIG. 8 is a schematic plan view of a discontinuous intersection of the cores in a conventional optical waveguide.

In an optical waveguide having intersecting cores, it has been proposed to reduce intersection losses (light propagation losses at intersections) by providing an intersection in the form of a discontinuous intersection, as shown in FIG. 8 (see PTL 2, for example). Specifically, at the discontinuous intersection of cores 22 including first and second cores 22a and 22b extending in two intersecting directions, the first core (horizontal core as seen in FIG. 8) 22a is separated by the second core (vertical core as seen in FIG. 8) 22b, and a gap G is formed between the separating second core 22b and each of the separated end portions of the separated first core 22a. In the separated first core 22a, the intersection loss is increased because light leakage from the gaps G occurs in the separated first core 22a. In the separating second core 22b, the intersection loss is 0 (zero) because the second core 22b is a straight core 22 having no separated locations and no continuous intersections. Thus, the intersection losses in the cores 22a and 22b extending in the two intersecting directions are reduced in total.

RELATED ART DOCUMENT

Patent Document

PTL 1: JP-B-5513656
PTL 2: JP-A-HEI3(1991)-287206

SUMMARY OF INVENTION

When the discontinuous intersection is used for the intersection of the cores 12 arranged in the lattice form in the aforementioned position sensor, the intersection loss is 0 (zero) in the separating second core, but the intersection loss is increased in the separated first core. It is hence desirable to further reduce the intersection loss in the separated first core, thereby further reducing the sum of the intersection losses in the two intersecting directions.

In view of the foregoing, it is therefore an object of the present invention to provide an optical waveguide including cores arranged in a lattice form in which intersection loss is further reduced in the case where, at each intersection of the cores including first and second cores extending in two intersecting directions, the first core is separated by the second core and a gap is formed between the separating second core and each of the separated end portions of the separated first core, and a position sensor using the same.

To accomplish the aforementioned object, a first aspect of the present invention is intended for an optical waveguide in a sheet form comprising: a plurality of linear cores arranged in a lattice form; and two cladding layers each in a sheet form, the two cladding layers holding the cores arranged in the lattice form therebetween, the cores including first and second cores extending in two respective directions and intersecting at each intersection in the lattice form, the first core being separated by the second core, there being a gap formed between the separating second core and each separated end portion of the separated first core, the separated end portions of the separated first core having a width greater than the width of the separating second core.

A second aspect of the present invention is intended for a position sensor comprising: an optical waveguide in a sheet form including a plurality of linear cores arranged in a lattice form, and two cladding layers each in a sheet form, the two cladding layers holding the cores arranged in the lattice form therebetween; a light-emitting element connected to a first end surface of the cores; and a light-receiving element connected to a second end surface of the cores, the cores including first and second cores extending in two respective directions and intersecting at each intersection in the lattice form, the first core being separated by the second core, there being a gap formed between the separating second core and each separated end portion of the separated first core, the separated end portions of the separated first core having a width greater than the width of the separating second core, wherein light emitted from the light-emitting element passes through the cores of the optical waveguide and is received by the light-receiving element, wherein a surface part of the position sensor corresponding to part of the cores arranged in the lattice form serves as an input region, and wherein a pressed position in the input region is specified, based on the amount of light propagating in the cores which is changed by the pressing.

With attention given to the width of the intersecting cores, the present inventors have made studies to further reduce the intersection loss in the case where, at each intersection of the cores arranged in the lattice form and including first and second cores extending in two intersecting directions, the first core is separated by the second core and a gap is are formed between the separating second core and each of the separated end portions of the separated first core. As a result, the present inventors have found out that the intersection loss in the cores arranged in the lattice form is further reduced by making the width of the separated first core greater than the width of the separating second core, although the cores extending in the two intersecting directions in the related art have the same width. Hence, the present inventors have attained the present invention.

In general, light is propagated in a core while being reflected from an inner wall such as a side wall of the core. Thus, the number of times that light is reflected from the side wall of the core (the number of times that light impinges upon the side wall) decreases with the increase in the width of the core. Thus, when the width of the separated first core is large, the probability that light reaches separated locations (discontinuous intersecting locations) is decreased, and the probability that light leaks sideways from the separated locations is decreased. From this, the intersection loss in the separated first core is reduced by increasing the width of the separated first core.

In general, when a core is separated, the probability that light propagating in the core leaks from a separated location to the outside decreases with the decrease in the distance of separation. Thus, when the width of the separated first core is made greater than the width of the separating second core as in the present invention, the width of the separating second core becomes relatively narrow. Thus, the distance of separation is shortened in the separated first core. This decreases the probability that light leaks from the separated location to the outside to reduce the intersection loss. In the separating second core, the intersection loss is 0 (zero) because the separating second core is a straight core having no separated locations and no continuous intersections.

The optical waveguide according to the present invention includes the cores arranged in the lattice form. At each intersection of the cores extending in the two intersecting directions, the first core is separated by the second core, and the gap is formed between the separating second core and each of the separated end portions of the separated first core. The width of the separated first core is greater than the width of the separating second core. Thus, in the separated first core, the number of times that light is reflected from the side wall thereof (the number of times that light impinges upon the side wall) is decreased, and the distance of separation is decreased. This decreases the probability that light leaks from the separated location to reduce the intersection loss. In the separating second core, the intersection loss is 0 (zero) because the separating second core is the straight core having no separated locations and no continuous intersections. Based on these facts, when the intersection losses in the cores extending in the two intersecting directions are summed up, the intersection loss in the cores arranged in the lattice form is further reduced in the optical waveguide according to the present invention.

The position sensor according to the present invention, which includes the optical waveguide of the present invention, is reduced in intersection loss in the cores arranged in the lattice form to increase the sensitivity for sensing of the pressed position.

In particular, when the width of the separated end portions of the separated first core is not greater than 50 times the width of the separating second core, the widths of the cores have more appropriate values for the position sensor.

DESCRIPTION OF EMBODIMENTS

Next, an embodiment according to the present invention will now be described in detail with reference to the drawings.

Figure 1A:
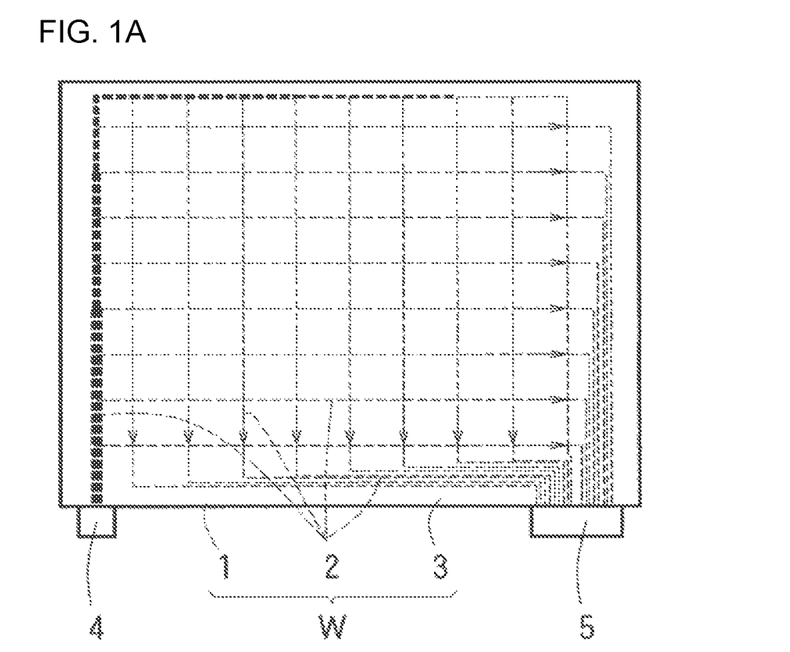
FIG. 1A is a schematic plan view of a position sensor according to one embodiment of the present invention.

FIG. 1A is a plan view of a position sensor according to one embodiment of the present invention. The position sensor of this embodiment includes: an optical waveguide W in a rectangular sheet form including linear cores 2 arranged in a lattice form; a light-emitting element 4 connected to one end surface of the linear cores 2 arranged in the lattice form; and a light-receiving element 5 connected to the other end surface of the linear cores 2. Light emitted from the light-emitting element 4 passes through the cores 2 and is received by the light-receiving element 5. In FIG. 1A, the cores 2 are indicated by broken lines, and the thickness of the broken lines indicates the thickness of the cores 2. Also, in FIG. 1A, the number of cores 2 is shown as abbreviated. Arrows in FIG. 1A indicate the directions in which light travels.

Figure 1B:
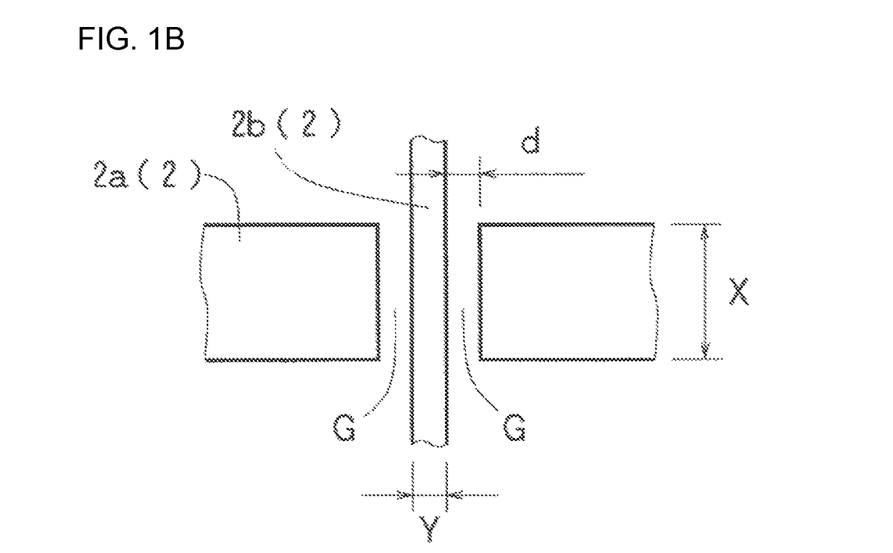
FIG. 1B is a schematic enlarged plan view of an intersection of cores arranged in a lattice form in the position sensor.

The aforementioned optical waveguide W is one embodiment of the optical waveguide of the present invention. As shown in plan view in FIG. 1B, each intersection of the cores 2 arranged in the lattice form and including first and second cores 2a and 2b extending in two intersecting directions (horizontal and vertical directions) is a discontinuous intersection where the first core (horizontal core as seen in FIG. 1B) 2a is separated by the second core (vertical core as seen in FIG. 1B) 2b and where a gap G is formed between the separating second core 2b and each of the separated end portions of the separated first core 2a. The width (X) of the separated first core 2a is greater than the width (Y) of the separating second core 2b [1<(X/Y)]. This is one of the striking features of the present invention. In this embodiment, the cores 2a and 2b extending in the two intersecting directions have the constant widths (X and Y). The gaps G have a width d greater than 0 (zero) (it is only necessary that the gaps G are formed). The width d of the gaps G is generally not greater than 50 μm, and preferably not greater than 20 μm.

As described above, the width (X) of the separated first core 2a is greater than the width (Y) of the separating second core 2b [1<(X/Y)] at the discontinuous intersection where the intersecting first core 2a is separated by the second core 2b and where the gap G is formed between the separating second core 2b and each of the separated end portions of the separated first core 2a. This further reduces the intersection loss in the cores 2 arranged in the lattice form.

In general, light is propagated in a core 2 while being reflected from an inner wall such as a side wall of the core 2. Thus, the number of times that light is reflected from the side wall of the core 2 (the number of times that light impinges upon the side wall) decreases with the increase in the width of the core 2. A comparison is made between FIG.

Figure 2A:
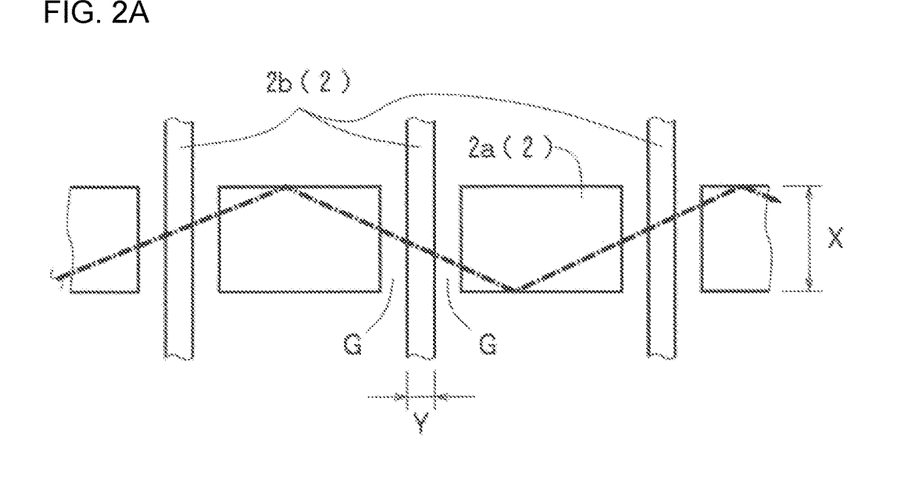
FIG. 2A is an illustration schematically showing a method of propagating light in a separated one of the cores arranged in the lattice form according to the present invention.
Figure 2B:
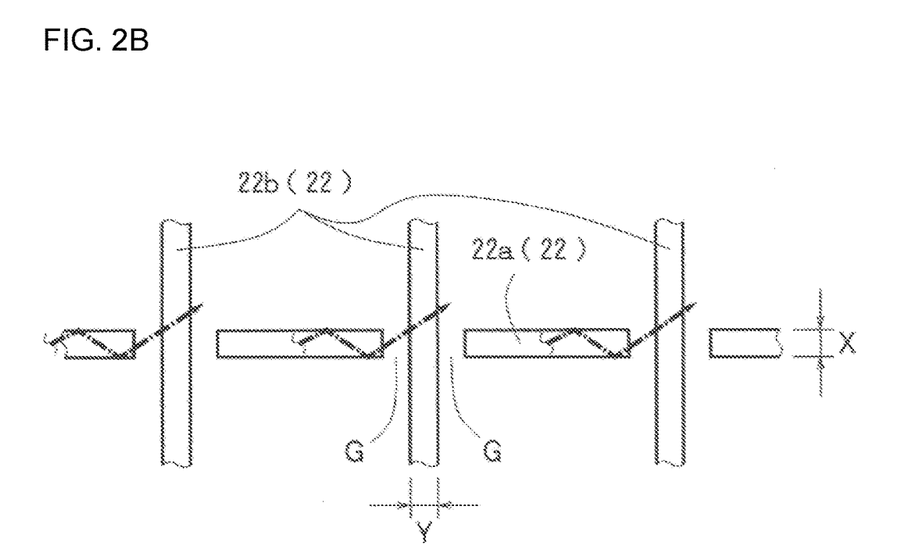
FIG. 2B is an illustration schematically showing a conventional method of propagating light in the separated core.

2A in which the cores 2a and 2b have the widths as described above and FIG. 2B in which the cores 22a and 22b extending in the two intersecting directions have the same width as in the related art (with reference to FIG. 8) described earlier. For the comparison, the separating second cores (vertical cores as seen in FIGS. 2A and 2B) 2b and 22b have the same width. As a result of the comparison, FIG. 2A in which the width (X) of the separated first core 2a is large shows that the number of times that light is reflected from the side wall of the core 2a (the number of times that light impinges upon the side wall) is small. Accordingly, the probability that light reaches separated locations (discontinuous intersecting locations) is low, and the probability that light leaks sideways from the separated locations is low (with reference to a dash-and-dot arrow in FIG. 2A). On the other hand, FIG. 2B in which the width (X) of the separated first core 22a is small shows that the number of times that light is reflected from the side wall of the core 22a (the number of times that light impinges upon the side wall) is large. Accordingly, the probability that light reaches the separated locations is high, and the probability that light leaks sideways from the separated locations is high (with reference to dash-and-dot arrows in FIG. 2B). From this, the intersection losses in the separated first cores 2a and 22a are smaller in FIG. 2A in which the core width (X) is larger.

Figure 3A:
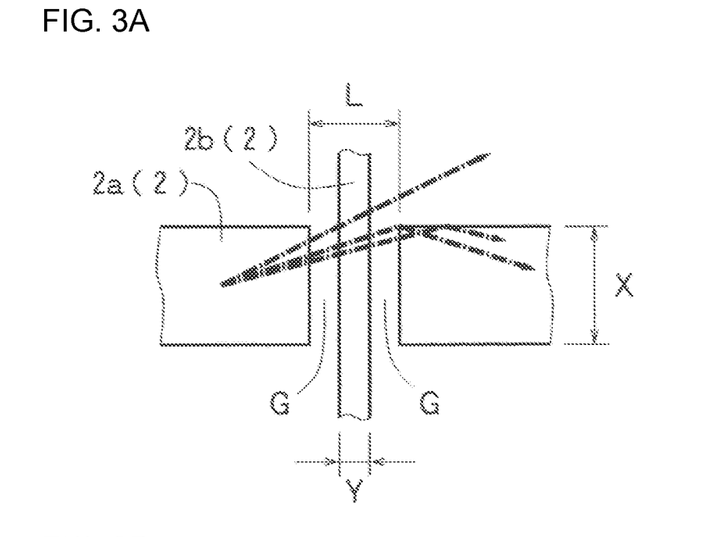
FIG. 3A is an illustration schematically showing paths of light at a discontinuous intersection of the cores arranged in the lattice form according to the present invention.
Figure 3B:
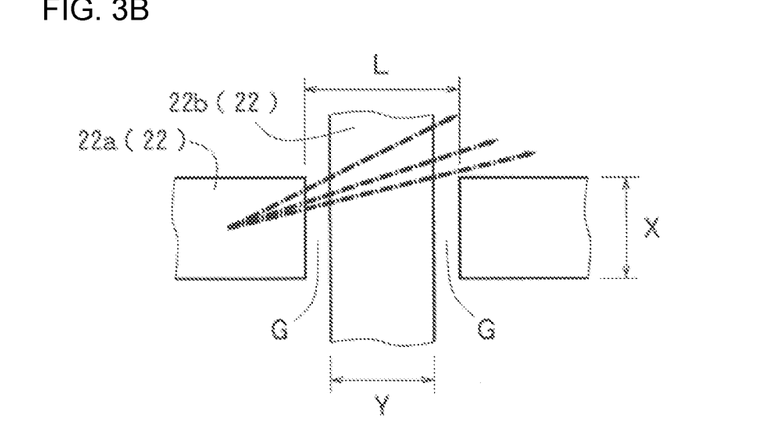
FIG. 3B is an illustration schematically showing paths of light at a conventional discontinuous intersection of the cores arranged in the lattice form.

In general, when a core 2 is separated, the probability that light propagating in the core 2 leaks from a separated location to the outside decreases with the decrease in the distance of separation. A comparison is made between FIG. 3A in which the cores 2a and 2b have the widths as described above and FIG. 3B in which the cores 22a and 22b extending in the two intersecting directions have the same width as in the related art (with reference to FIG. 8) described earlier. For the comparison, the separated first cores (horizontal cores as seen in FIGS. 3A and 3B) 2a and 22a have the same width. As a result of the comparison, FIG. 3A in which the width (Y) of the separating second core 2b is small and the distance L of the separation is short shows that the probability that light leaks from the separated location to the outside is low (with reference to dash-and-dot arrows in FIG. 3A). On the other hand, FIG. 3B in which the width (Y) of the separating second core 2b is large and the distance L of the separation is long shows that the probability that light leaks from the separated location to the outside is high (with reference to dash-and-dot arrows in FIG. 3B). From this, the intersection losses in the separated first cores 2a and 22a are smaller in FIG. 3A in which the distance L of the separation is shorter.

In the separating second core 2b, the intersection loss is 0 (zero) because the second core 2b is a straight core 2 having no separated locations and no continuous intersections. Based on these facts, when the intersection losses in the cores 2a and 2b extending in the two intersecting directions among the cores 2 arranged in the lattice form having the aforementioned feature are summed up, the intersection loss in the cores 2 arranged in the lattice form is very low as mentioned above.

Figure 4:
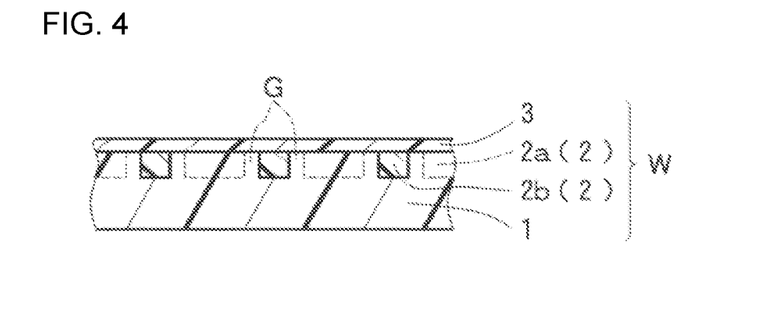
FIG. 4 is a schematic enlarged sectional view of a middle part of an optical waveguide according to the one embodiment of the present invention.

In this embodiment, as shown in sectional view in FIG. 4, the optical waveguide W in the sheet form is configured such that the cores 2 arranged in the lattice form are buried in a surface part of an under cladding layer 1 in a sheet form so that the top surface of the cores 2 is flush with the surface of the under cladding layer 1, and such that an over cladding layer 3 in a sheet form is formed so as to cover the surface of the under cladding layer 1 and the top surface of the cores 2. In this embodiment, the gaps G in the separated locations of the core 2a are made of a material for the formation of the under cladding layer 1. For the optical waveguide W having the aforementioned structure, examples of the thicknesses of the respective layers are as follows: the under cladding layer 1 has a thickness in the range of 10 to 500 μm; the cores 2 have a thickness in the range of 5 to 100 μm; and the over cladding layer 3 has a thickness in the range of 1 to 200 μm.

In the aforementioned position sensor employing the optical waveguide W in the sheet form, a surface part of the over cladding layer 3 corresponding to part of the cores 2 arranged in the lattice form serves as an input region. The input of a character and the like to the position sensor is performed by writing the character and the like into the input region with an input element such as a pen either directly or through a resin film, paper and the like. At this time, the input region is pressed with the tip of the pen and the like, so that some of the cores 2 corresponding to the pressed part are deformed. The deformation decreases the amount of light propagating in these cores 2. Thus, the level of light detected by the light-receiving element 5 is decreased in the cores 2 corresponding to the pressed part. In this manner, the position sensor senses the pressed position.

Further, the intersection loss in the cores 2 arranged in the lattice form is very low in the position sensor. Accordingly, the level of light detected by the light-receiving element 5 is decreased little in the cores 2 corresponding to parts other than the pressed part. This achieves a large difference in the level of light detected by the light-receiving element 5 between the pressed part and parts other than the pressed part to allow the definite sensing of the pressed position with the tip of the pen and the like. Also, even when the amount of decrease in the level of detected light due to the pressing is small because of a low writing pressure and the like during the input operation, the difference from the level of detected light in parts other than the pressed part appears definitely, so that the pressed position is sensed with reliability. In this manner, the position sensor is high in sensitivity for sensing of the pressed position.

In the position sensor, it is in particular necessary that part of the cores 2 for connection to the light-receiving element 5 are formed to have a reduced width in accordance with the dimensions of the light-receiving element 5 so as to be connectable to the light-receiving element 5. In such a case, width reduction loss (light propagation loss due to the reduction in core width) occurs. The higher the degree of reduction in core width is, the higher the width reduction loss is. As mentioned above, the width (X) of the separated first core 2a is greater than the width (Y) of the separating second core 2b [1<(X/Y)] for the purpose of making the intersection loss low. When the width (X) of the separated first core 2a is large, the intersection loss is low, but the width reduction loss is high. In the position sensor, it is preferable that the width (X) of the separated first core 2a is not greater than 50 times the width (Y) of the separating second core 2b [1<(X/Y)<50] from the viewpoint of minimizing the intersection loss while preventing the width reduction loss from being very high.

It is preferable that the cores 2 have an elasticity modulus higher than the elasticity moduli of the under cladding layer 1 and the over cladding layer 3. The reason for this is as follows. If the elasticity modulus of the cores 2 is lower than the elasticity moduli of the under cladding layer 1 and the over cladding layer 3, the surroundings of the cores 2 are hard, so that part of the optical waveguide W having an area significantly wider than the area of the pen tip and the like pressing part of the input region of the over cladding layer 3 is depressed. As a result, it tends to be difficult to precisely sense the pressed position. For this reason, it is preferable that the elasticity moduli are as follows: the cores 2 have an elasticity modulus in the range of 1 GPa to 10 GPa; the over cladding layer 3 has an elasticity modulus in the range of 0.1 GPa to less than 10 GPa; and the under cladding layer 1 has an elasticity modulus in the range of 0.1 MPa to 1 GPa, for example. In this case, the cores 2 are not crushed (the cross-sectional area of the cores 2 is not decreased) with a small pressing force because of the high elasticity modulus of the cores 2. However, the optical waveguide W is depressed by the pressing, so that light leakage (scattering) occurs from the bent part of the cores 2 corresponding to the depressed part. Thus, the level of light detected by the light-receiving element 5 (with reference to FIG. 1(*a*)) is decreased in these cores 2. In this manner, the pressed position is sensed.

Examples of materials for the formation of the under cladding layer 1, the cores 2, and the over cladding layer 3 include photosensitive resins and thermosetting resins. The optical waveguide W may be produced by a manufacturing method depending on the materials. The cores 2 have a refractive index higher than the refractive indices of the under cladding layer 1 and the over cladding layer 3. The adjustment of the elasticity moduli and the refractive indices may be made, for example, by adjusting the selection of the types of the materials for the formation of the cores 2, the under cladding layer 1 and the over cladding layer 3, and the composition ratio thereof. A rubber sheet may be used as the under cladding layer 1, and the cores 2 may be formed in a lattice form on the rubber sheet.

Figure 5A:
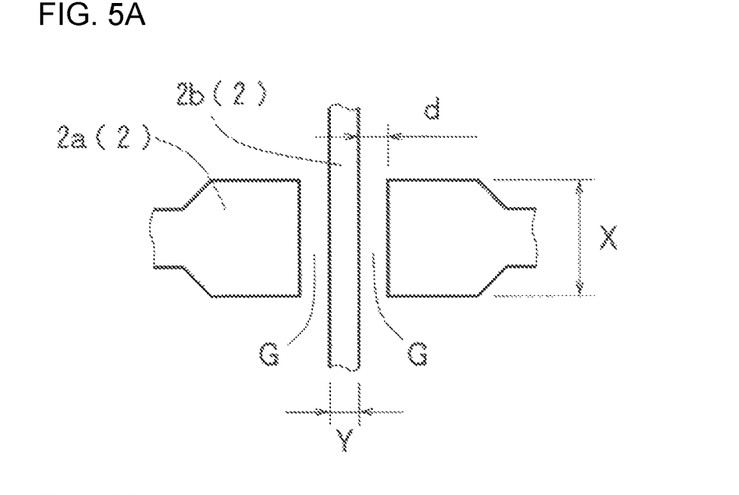
FIGS. 5A and 5B are schematic enlarged plan views of modifications of the intersection of the cores arranged in the lattice form.
Figure 5B:
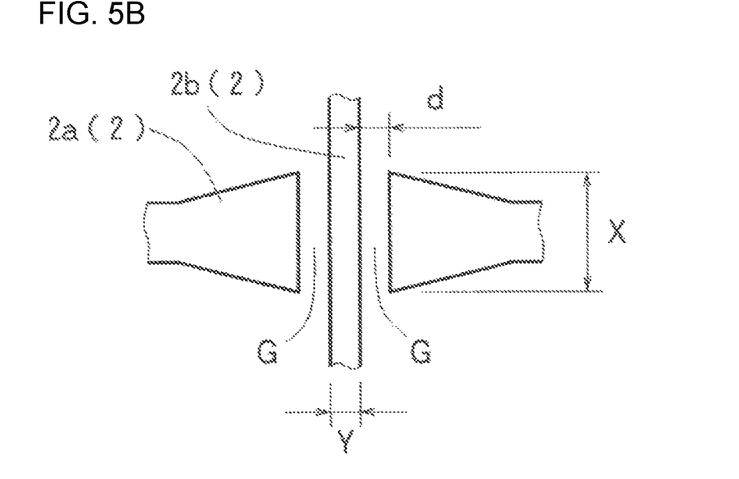

Although the cores 2*a* and 2*b* extending in the two intersecting directions have the constant widths (X and Y) in the aforementioned embodiment, the separated first core 2*a* need not have the constant width, as shown in FIGS. 5A and 5B. Specifically, with reference to FIG. 5A, the separated first core 2*a* has separated end portions having a constant width (X) which is greater than the width (Y) of the separating second core 2*b* [1<(X/Y)]. The portions of the core 2*a* other than the end portions having the constant width (X) have a width less than the constant width (X). With reference to FIG. 5B, the separated first core 2*a* has separated end surfaces having a constant width (X) which is greater than the width (Y) of the separating second core 2*b* [1<(X/Y)]. The separated end portions of the core 2*a* other than the end surfaces have a width gradually decreasing away from the separating second core 2*b*. These settings also achieve the further reduction in intersection loss in the cores 2 arranged in the lattice form as in the aforementioned embodiment.

Figure 6:
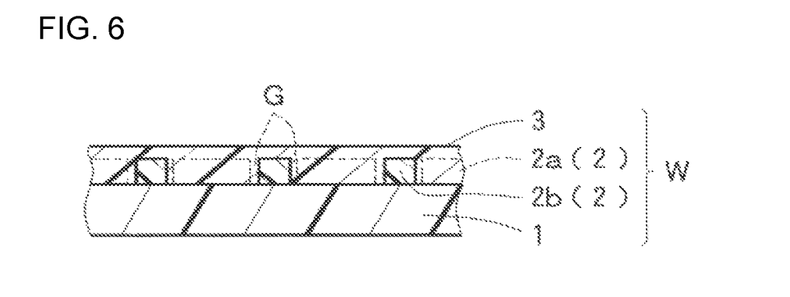
FIG. 6 is a schematic enlarged sectional view of a principal part of a modification of the optical waveguide.

The optical waveguide W has a cross-sectional structure shown in FIG. 4 in the aforementioned embodiment, but may have other cross-sectional structures. For example, as shown in sectional view in FIG. 6, the optical waveguide W may have a cross-sectional structure such that the cores 2 in a protruding shape are formed in a predetermined pattern on the surface of the under cladding layer 1 in a sheet form with a uniform thickness, and such that the over cladding layer 3 is formed on the surface of the under cladding layer 1 so as to cover the cores 2. In this structure, the gaps G in the separated locations of the core 2*a* are made of the material for the formation of the over cladding layer 3.

Further, although each of the intersections of the cores 2 arranged in the lattice form is the aforementioned discontinuous intersection shown in FIG. 1B in the aforementioned embodiment, some of the intersections may be the continuous intersections.

Next, inventive examples of the present invention will be described in conjunction with comparative examples. It should be noted that the present invention is not limited to the inventive examples.

EXAMPLES

[Material for Formation of Under Cladding Layer and Over Cladding Layer]

Component a: 75 parts by weight of an epoxy resin (YL7410 available from Mitsubishi Chemical Corporation).

Component b: 25 parts by weight of an epoxy resin (JER1007 available from Mitsubishi Chemical Corporation).

Component c: 2 parts by weight of a photo-acid generator (CPI101A available from San-Apro Ltd.).

A material for the formation of an under cladding layer and an over cladding layer was prepared by mixing these components a to c together.

[Material for Formation of Cores]

Component d: 75 parts by weight of an epoxy resin (EHPE3150 available from Daicel Corporation).

Component e: 25 parts by weight of an epoxy resin (KI-3000-4 available from Tohto Kasei Co., Ltd.).

Component f: 1 part by weight of a photo-acid generator (SP170 available from ADEKA Corporation).

Component g: 50 parts by weight of ethyl lactate (a solvent available from Wako Pure Chemical Industries, Ltd.).

A material for the formation of cores was prepared by mixing these components d to g together.

[Production of Optical Waveguide]

First, the over cladding layer was formed on a surface of a base material made of glass by a spin coating method with the use of the aforementioned material for the formation of the over cladding layer. The over cladding layer had a thickness of 25 µm. The over cladding layer had an elasticity modulus of 3 MPa. A viscoelasticity measuring device (RSA3 available from TA instruments Japan Inc.) was used for the measurement of the elasticity modulus.

Next, the cores arranged in a lattice form were formed on a surface of the over cladding layer by a photolithographic method with the use of the aforementioned material for the formation of the cores. Each intersection of the cores arranged in the lattice form in Inventive Examples 1 to 8 and Comparative Examples 1 and 2 was a discontinuous intersection (with reference to FIG. 1B) where a horizontal core was separated by a vertical core and a gap was formed between the vertical core and each separated end portion of the horizontal core. Each intersection of the cores arranged in the lattice form in Comparative Example 3 was a continuous intersection (with reference to FIG. 7) where the cores are not separated. The width (X) of the horizontal core, the width (Y) of the vertical core and the width (d) of the gaps in the separated location of the horizontal core had values listed in TABLE 1 below. The cores had a thickness of 30 µm. The number of horizontal cores was 350, and the number of vertical cores was 495. The cores had a spacing of 600 µm. The cores had an elasticity modulus of 3 GPa.

Next, the under cladding layer was formed on the upper surface of the over cladding layer by a spin coating method with the use of the aforementioned material for the formation of the under cladding layer so as to cover the cores. The under cladding layer had a thickness of 300 µm. The under cladding layer had an elasticity modulus of 3 MPa.

Then, the over cladding layer was stripped from the base material made of glass. Next, the under cladding layer was bonded to a surface of an aluminum plate with an adhesive agent. In this manner, an optical waveguide in each of Inventive and Comparative Examples was produced on the surface of the aluminum plate, with the adhesive agent therebetween.

[Calculation of Intersection Loss]

Light (wavelength of 850 nm) emitted from a vertical-cavity surface-emitting laser (OP250 available from Miki Inc.) was passed through the cores arranged in the lattice form. An optical multi power meter (Q8221 available from Advantest Corporation) received the light to measure the intensity (B) of the received light. The intensity (B) of the received light was measured for each of the horizontal and vertical cores. Likewise, light emitted from the VCSEL was passed through straight cores. The optical multi power meter received the light to measure the intensity (C) of the received light. The intensity (A) of light emitted from the VCSEL was measured using the optical multi power meter. Then, the intersection loss (D) was calculated using Equation (1) below. The sum of the horizontal intersection loss and the vertical intersection loss was calculated. These results were listed in TABLE 1 below.

[MATH. 1]

$$D = -10 \log_{10}(B/A) + 10 \log_{10}(C/A) \qquad (1)$$

TABLE 1

| | | Inventive Examples | | | | | | | | Comparative Examples | | |
|---|---|---|---|---|---|---|---|---|---|---|---|---|
| | | 1 | 2 | 3 | 4 | 5 | 6 | 7 | 8 | 1 | 2 | 3 |
| Gap: d (μm) | | 10 | 10 | 20 | 50 | 10 | 10 | 10 | 10 | 10 | 10 | 0 |
| Core width | X (μm) | 50 | 100 | 100 | 200 | 200 | 250 | 300 | 500 | 10 | 25 | 100 |
| | Y (μm) | 25 | 25 | 10 | 10 | 10 | 10 | 10 | 10 | 25 | 25 | 100 |
| Ratio: X/Y | | 2 | 4 | 10 | 20 | 20 | 25 | 30 | 50 | 0.4 | 1 | 1 |
| Intersection loss | Hor. | 38.5 | 30.8 | 22.4 | 40.3 | 10.5 | 9.0 | 9.0 | 8.5 | 118.3 | 79.1 | 35.0 |
| | Vert. | 0 | 0 | 0 | 0 | 0 | 0 | 0 | 0 | 0 | 0 | 49.5 |
| (dB) | Sum | 38.5 | 30.8 | 22.4 | 40.3 | 10.5 | 9.0 | 9.0 | 8.5 | 118.3 | 79.1 | 84.5 |

It is found from the results listed in TABLE 1 above that the greater the ratio (X/Y) between the width (X) of the separated horizontal core and the width (Y) of the separating vertical core is, the lower the intersection loss tends to become, as a result of the comparisons among Inventive Examples 1, 2, and 5 to 8 and Comparative Examples 1 and 2 which have the same gaps (d) of 10 μm. In particular, it is found that the intersection loss is further lower in Inventive Examples 1 to 8 in which the ratio (X/Y) is greater than 1. It is also found that the intersection loss is high in Comparative Example 3 including the continuous intersections.

Results similar to those of Inventive Examples were obtained when some of the intersections in the lattice form were the continuous intersections in Inventive Examples.

Although specific forms in the present invention have been described in the aforementioned examples, the aforementioned examples should be considered as merely illustrative and not restrictive. It is contemplated that various modifications evident to those skilled in the art could be made without departing from the scope of the present invention.

The optical waveguide and the position sensor using the same according to the present invention are applicable to further reduction in intersection loss in the cores arranged in the lattice form.

REFERENCE SIGNS LIST

G Gaps
W Optical waveguide
2, 2a and 2b Cores

The invention claimed is:

1. An optical waveguide in a sheet form, comprising:
a plurality of linear cores arranged in a lattice form; and
two cladding layers each in a sheet form, the two cladding layers holding the cores arranged in the lattice form therebetween,
wherein the cores include first and second cores extending in two respective directions and intersecting at each intersection in the lattice form,
wherein ends of the first core that intersect the second core are separated from each other with gaps between the ends of the first core and the second core, and
wherein the ends of the first core have a width that is larger than a width of the second core.

2. A position sensor, comprising:
an optical waveguide in a sheet form including a plurality of linear cores arranged in a lattice form, and two cladding layers each in a sheet form, the two cladding layers holding the cores arranged in the lattice form therebetween;
a light-emitting element connected to a first end surface of the cores; and
a light-receiving element connected to a second end surface of the cores,
wherein the cores include first and second cores extending in two respective directions and intersecting at each intersection in the lattice form,
wherein ends of the first core that intersect the second core are separated from each other with gaps between the ends of the first core and the second core,
wherein the ends of the first core have a width that is larger than a width of the second core,
wherein light emitted from the light-emitting element passes through the cores of the optical waveguide and is received by the light-receiving element,
wherein a surface part of the position sensor corresponding to part of the cores arranged in the lattice form serves as an input region, and
wherein a pressed position in the input region is specified, based on the amount of light propagating in the cores which is changed by the pressing.

3. The position sensor according to claim 2, wherein the width of the end portions of the first core is not greater than 50 times the width of the second core.

* * * * *